(12) United States Patent
O'brien (10) Patent No.: US 8,484,500 B2
(45) Date of Patent: Jul. 9, 2013

(54) POWER SUPPLY SEQUENCING DISTRIBUTED AMONG MULTIPLE DEVICES WITH LINKED OPERATION

(75) Inventor: Thomas J O'brien, Powell, OH (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 12/001,766

(22) Filed: Dec. 12, 2007

(65) Prior Publication Data

US 2009/0070613 A1 Mar. 12, 2009

Related U.S. Application Data

(63) Continuation of application No. 11/119,307, filed on Apr. 28, 2005, now Pat. No. 7,337,342.

(51) Int. Cl.
*G06F 1/00* (2006.01)

(52) U.S. Cl.
USPC .................. 713/330; 713/300; 713/340

(58) Field of Classification Search
USPC .......................................... 713/300, 330, 340
See application file for complete search history.

(56) References Cited

U.S. PATENT DOCUMENTS

| | | | |
|---|---|---|---|
| 5,121,500 A | | 6/1992 | Arlington et al. |
| 5,559,376 A | * | 9/1996 | Tachikawa ................. 307/86 |
| 6,041,414 A | * | 3/2000 | Kikuchi ..................... 713/300 |
| 6,125,440 A | | 9/2000 | Osovets |
| 6,212,645 B1 | * | 4/2001 | Tjandrasuwita ............. 713/330 |
| 6,333,650 B1 | * | 12/2001 | Amin et al. .................. 327/143 |
| 6,429,706 B1 | * | 8/2002 | Amin et al. .................. 327/143 |
| 6,510,525 B1 | * | 1/2003 | Nookala et al. ............. 713/324 |
| 6,671,816 B1 | * | 12/2003 | Woo ........................... 713/330 |
| 6,792,553 B2 | * | 9/2004 | Mar et al. ................... 713/330 |
| 6,850,048 B2 | * | 2/2005 | Orr et al. .................... 323/299 |
| 6,868,501 B2 | * | 3/2005 | Saitou et al. ................ 713/330 |
| 6,879,139 B2 | * | 4/2005 | Brown et al. ............... 323/299 |
| 6,936,999 B2 | | 8/2005 | Chapuis |
| 6,949,916 B2 | | 9/2005 | Chapuis |
| 7,000,125 B2 | | 2/2006 | Chapuis et al. |
| 7,034,569 B1 | * | 4/2006 | Balasubramanian et al. .. 326/38 |
| 7,049,798 B2 | | 5/2006 | Chapuis et al. |
| 7,080,273 B2 | * | 7/2006 | Brown et al. ............... 713/330 |
| 7,337,342 B1 | * | 2/2008 | O'Brien ...................... 713/330 |

(Continued)

OTHER PUBLICATIONS

Tom DeLurio and George Hall, "Intelligent Backplane Power Management Design," Summit Microelectronics, Inc., Aug. 2003.

(Continued)

*Primary Examiner* — Jaweed A Abbaszadeh
(74) *Attorney, Agent, or Firm* — Fountainhead Law Group P.C.

(57) ABSTRACT

A system and method is provided to accomplish distributed power sequencing function of a large electronics system with minimum number of signals in the sequencing network without compromising the flexibility and expandability. In one embodiment of the invention, the power sequencing function is accomplished with two signals of the sequencing network: power_on/power_off signal and SEQ_LINK signal. The power_on/power_off signal controls whether the sequencing is in power_on mode for turning on power to multiple devices in a predetermined sequence or power_off mode for for turning off power to multiple devices in a reverse sequence. The SEQ_LINK signal controls when the sequence counters, located in each participating device, are allowed to count to the subsequent state. Each sequencing logic circuit of these participating devices responds to a predetermined sequence position to enable the power on or power off of the power supply it controls.

32 Claims, 6 Drawing Sheets

U.S. PATENT DOCUMENTS

| | | | | |
|---|---|---|---|---|
| 7,434,077 B2 * | 10/2008 | Saito et al. | | 713/340 |
| 7,529,958 B2 * | 5/2009 | Roth et al. | | 713/330 |
| 7,564,149 B2 * | 7/2009 | Siri et al. | | 307/80 |
| 2004/0215991 A1 * | 10/2004 | McAfee et al. | | 713/324 |
| 2005/0240789 A1 * | 10/2005 | Saito et al. | | 713/340 |
| 2006/0017327 A1 * | 1/2006 | Siri et al. | | 307/43 |

OTHER PUBLICATIONS

Application Note 25, Summit Microelectronics, Inc., Jun. 2002.
Application Note 32, Summit Microelectronics, Inc., Mar. 2003.
Application Note 33, Summit Microelectronics, Inc., Apr. 2008.
Application Note 39, Summit Microelectronics, Inc., Jun. 2003.
Application Note 42, Summit Microelectronics, Inc., Oct. 2003.
Application Note 43, Summit Microelectronics, Inc., Jul. 2003.
Application Note 47, Summit Microelectronics, Inc., Oct. 2004.
Application Note 51, Summit Microelectronics, Inc., May 2008.
Application Note 70, Summit Microelectronics, Inc., Feb. 2009.
Preliminary Information Data Sheet SMM465, Summit Microelectronics, Inc., May 2004.
Preliminary Information Data Sheet SMM665, Summit Microelectronics, Inc., May 2004.
Preliminary Information Data Sheet SMM665B, Summit Microelectronics, Inc., Apr. 2007.
Preliminary Information Data Sheet SMM665C, Summit Microelectronics, Inc., Jul. 2008.
Preliminary Information Data Sheet SMM764, Summit Microelectronics, Inc., Jun. 2005.
Preliminary Information Data Sheet SMM766, Summit Microelectronics, Inc., Apr. 2007.
Preliminary Information Data Sheet SMM766B, Summit Microelectronics, Inc., May 2008.
Preliminary Information Data Sheet SMS11, Summit Microelectronics, Inc., Jan. 2007.
Preliminary Information Data Sheet SMS44, Summit Microelectronics, Inc., Dec. 2005.
Preliminary Information Data Sheet SMS45, Summit Microelectronics, Inc., Apr. 2009.
Preliminary Information Data Sheet SMS47, Summit Microelectronics, Inc., Jun. 2004.
Preliminary Information Data Sheet SMS64, Summit Microelectronics, Inc., Oct. 2003.
Preliminary Information Data Sheet SMS66, Summit Microelectronics, Inc., Apr. 2006.

* cited by examiner

POWER SUPPLY SEQUENCING DISTRIBUTED AMONG MULTIPLE DEVICES WITH LINKED OPERATION

CROSS REFERENCE TO RELATED APPLICATIONS

This invention is a continuation of and claims the benefit of priority from U.S. patent application Ser. No. 11/119,307, filed Apr. 28, 2005, entitled "Power Supply Sequencing Distributed Among Multiple Devices with Linked Operation," the disclosure of which is hereby incorporated herein by reference.

BACKGROUND

1. Field

The invention relates in general to electronics systems and, in particular to power management in electronics systems.

2. Related Art

Electronics systems are frequently comprised of multiple devices. It is often advantageous to have an automatic system for turning on power or turning off power to multiple devices in a predetermined sequence for functional purposes or for reliability considerations. Conventional power sequencing circuits employ centralized control circuitry to turn on power for a first device, then waits for a specified amount of programmed delay time before it turns on power for a second device and so on. Power off sequencing is done in the same manner typically in a reverse order to the power on sequencing. Each device requires its own connection with the centralized controller making system reconfiguration or expansion cumbersome. In a distributed power sequencing approach, each device includes sequencing logic circuit to participate in providing power sequencing function with the centralized control circuitry in a coordinated manner. The communications among the central control circuitry and each of the sequencing logic circuit on these participating devices are accomplished via signals in a sequencing network. The flexibility and expandability of the power sequencing function to support reconfiguration or expansion of the electronics system is limited by available signals in the sequencing network. Accordingly, there is a need for an improved system and method to accomplish the power sequencing function of a large electronics system with minimum number of signals in the sequencing network without compromising the flexibility and expandability.

SUMMARY

This invention enables seamless distribution of the power sequencing function, normally limited by available signals of a sequencing network in an electronics system, over multiple devices for expanding the functional capacity of the sequencing network for the system. In one embodiment of the invention, the power sequencing function is accomplished with two signals of the sequencing network: power_on/power_off signal and SEQ_LINK signal. The power_on/power_off signal controls whether the sequencing is in power_on mode for turning on power to multiple devices in a predetermined sequence or power_off mode for turning off power to multiple devices in a reverse sequence. The SEQ_LINK signal controls when the sequence counters, located in each participating device, are allowed to count to the subsequent state. During power supply sequencing it is often necessary to monitor the supply output after it has been enabled to ensure that it turns on fully before sequencing the next supply. Using the open drain SEQ_LINK signal, any device can pull the signal low allowing it to hold-off the sequence until the power supply the particular device is monitoring has turned on or turned off fully. Once this has occurred, the device can let go of the SEQ_LINK signal allowing it to return high as long as no other device is pulling it low. The change in the state of the SEQ_LINK signal causes multiple linked devices to increment or decrement their sequence counters resulting in a sequenced operation in a coordinated manner. Each sequencing logic circuit of these participating devices responds to a predetermined state of its sequence counter to enable the power on or power off of the power supply it controls. This predetermined state of the sequence counter is called the sequence position.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
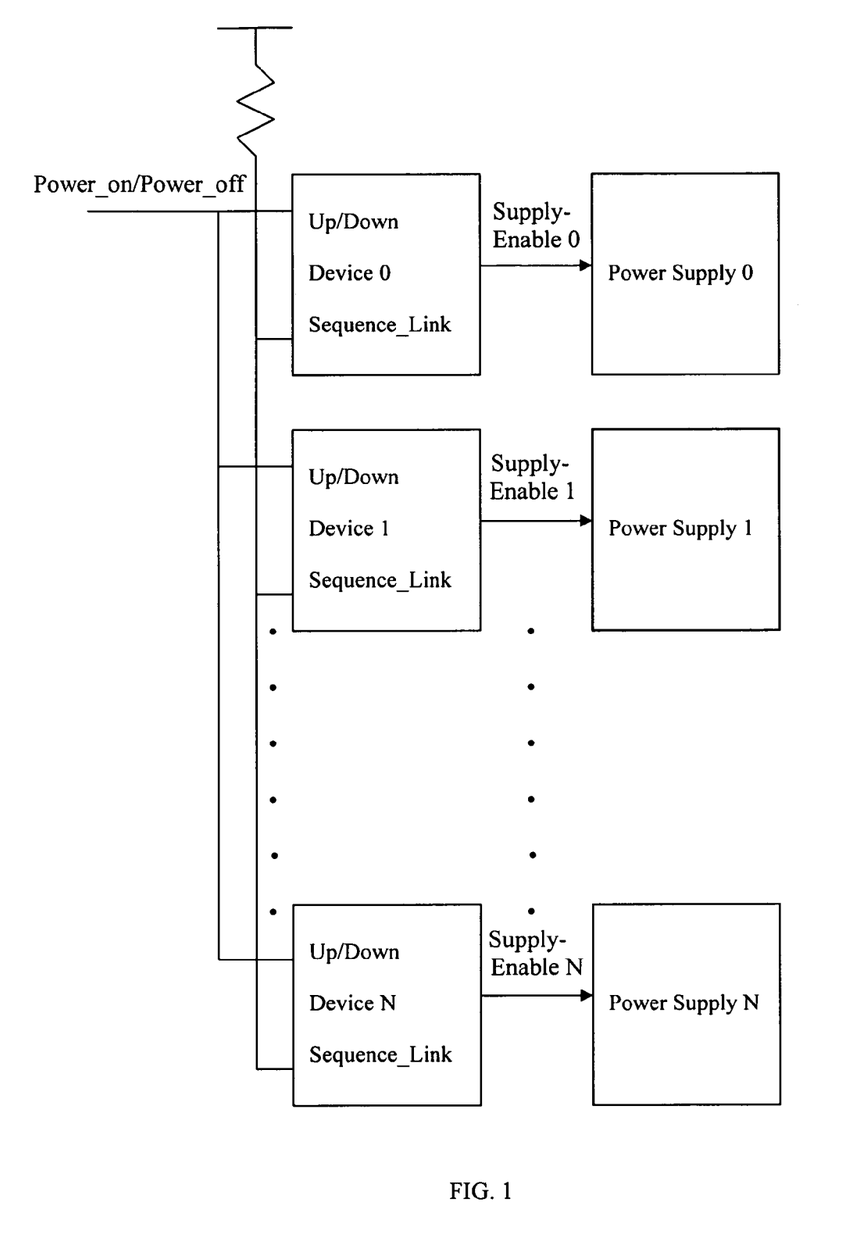
FIG. 1 is a diagram illustrating an electronics system wherein the system and method of the present invention may advantageously be utilized.

FIG. 1 is a diagram illustrating an electronics system comprising device 0, device 1, through device N for enabling and monitoring power supply 0, power supply 1, through power supply N via control signals supply_enable 0, supply_enable 1, through supply_enable N and supply_voltage 0, supply_voltage 1, through supply_voltage N. A power_on/power_off signal controls each device to be in a power on mode or a power off mode. Each device drives a SEQ_LINK signal via an open drain wired-OR circuit.

Figure 2:
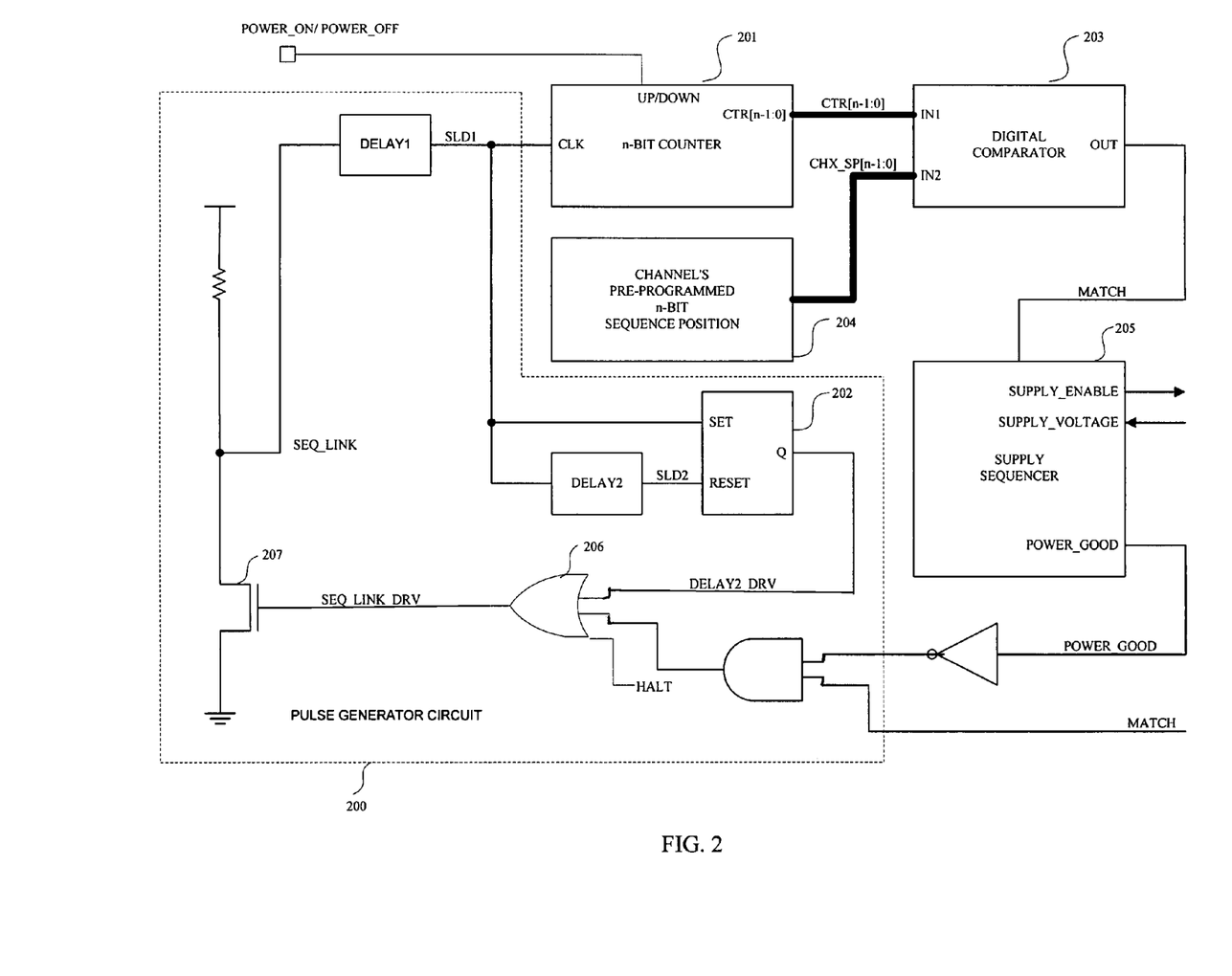
FIG. 2 is a more detailed block diagram of the sequencing logic circuit in a device of a power sequencing system in accordance with an embodiment of the present invention.

FIG. 2 is a more detailed block diagram of the sequencing logic circuit in each of the devices in FIG. 1. With the exception of the SEQ_LINK and POWER_ON/POWER_OFF being global signals in FIG. 1, the rest of the components and signals shown in FIG. 2 are local to each of the devices in FIG. 1.

A n-BIT COUNTER 201 has a negative edge triggered clock input CLK-driven by signal SLD1 which is a delayed version of signal SEQ_LINK. The n-BIT COUNTER 201 is configured by the signal POWER_ON/POWER_OFF to either increment or decrement a n-bit CTR[n−1:0] signal responding to the negative edge of the SLD1 signal.

A DIGITAL COMPARATOR 203 generates a MATCH signal by comparing the n-bit CTR[n−1:0] signal generated by the n-BIT COUNTER to a n-bit CHX_SP[n−1:0] signal generated by PRE-PROGRAMMED n-BIT SEQUENCE POSITION 204. The MATCH signal causes a SUPPLY SEQUENCER 205 to generate a SUPPLY_ENABLE signal which enables a power supply associated with the particular sequencing logic circuit. The PRE-PROGRAMMED n-BIT SEQUENCE POSITION 204 in each of the devices in FIG. 1 are independently configured according to a predetermined sequence.

The SUPPLY SEQUENCER 205 monitors the power supply and generates a POWEER_GOOD signal upon the power supply reaching a stable state after being enabled. The POWEER_GOOD signal and MATCH signal together generate a SEQ_LINK_DISABLE signal which can disable or enable a pulse generator circuit 200 composed of NOR gate 206, open drain transistor 207, DELAY1, DELAY2, and SET/RESET circuit 202. All of the pulse generator circuits 200 in each of the devices in FIG. 1 are disabled and enabled together according to the wired-OR operation of the open drain transistor connection to the global signal SEQ_LINK. While enabled, the pulse generator circuit 200 generates a SEQ_LINK signal with pulse high width equaling DELAY1 approximately and pulse low width equaling DELAY2 approximately. At the beginning of the power sequencing operation in each of the devices in FIG. 1, a HALT signal is deactivated and the pulse generator circuit 200 is enabled, signal SEQ_LINK increments or decrements the n-BIT COUNTER synchronously and repetitively until a MATCH signal is generated in one or more of the devices in FIG. 1. The MATCH signal causes the corresponding SUPPLY SEQUENCER 205 to generate a SUPPLY_ENABLE signal and to hold the corresponding POWER_GOOD signal in a low state prior to the corresponding power supply reaching a stable state after being enabled. The corresponding SEQ_LINK_DISABLE signal are held active high by the MATCH signal and the corresponding POWER_GOOD signal to disable the corresponding pulse generator circuit 200 with the SEQ_LINK signal being held at a low state. As a result, all of the pulse generator circuits 200 in each of the devices in FIG. 1 are disabled according to the wired-OR operation of the open drain transistor connection to the global signal SEQ_LINK. Upon all corresponding power supplies in each of the devices having a MATCH signal generated reaching stable state, all the corresponding SEQ_LINK_DISABLE signals are deactivated. As a result, all the pulse generator circuits 200 in each of the devices in FIG. 1 are again enabled and the n-BIT COUNTER in each of the devices in FIG. 1 continue to increment or decrement until a next MATCH signal is generated with another matching sequence position in one or more of the devices in FIG. 1. Additional power supplies in these one or more devices are enabled in the same way as described previously. In this fashion the SEQ_LINK signal eventually increment or decrement all the n-BIT COUNTER in each of the devices in FIG. 1 to a terminal state wherein all the power supplies in all devices in FIG. 1 are enabled. A HALT signal is generated at this point to disable all the pulse generator circuits in the system. The power sequencing operation is complete.

During the power sequencing operation, through the operation of the open drain wired-OR circuits, all of the pulse generator circuits 200 in each of the devices in FIG. 1 operate in a coordinated manner to generate the SEQ_LINK with pulse high width equaling DELAY1 approximately and pulse low width equaling DELAY2 approximately as long as none of the devices has a MATCH signal generated. Any one of device 0, device 1, through device N having a MATCH signal generated can hold SEQ_LINK signal at a low state and disable all the pulse generator circuits 200 in the system of FIG. 1.

Figure 3A:
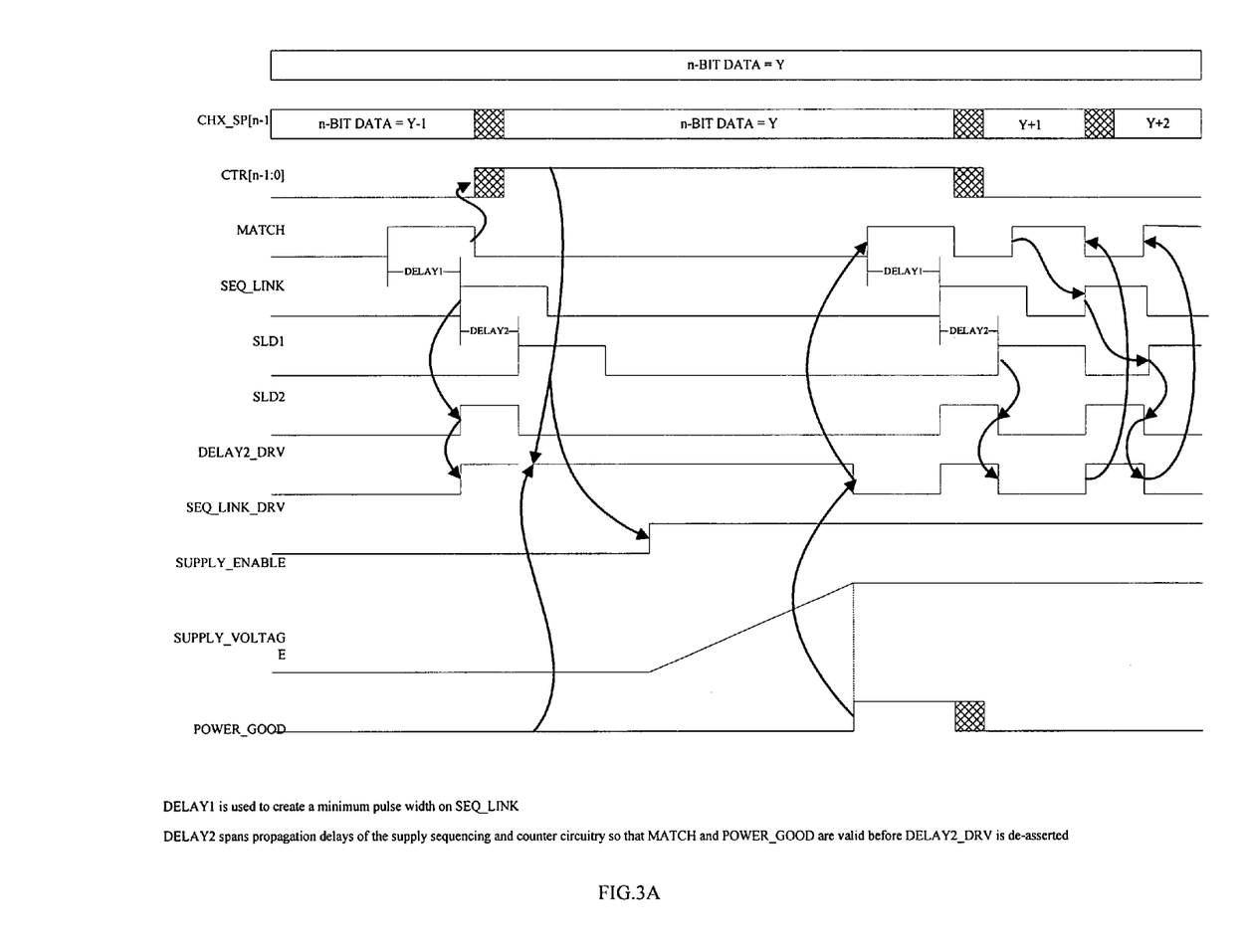
FIGS. 3A, 3B, and 3C are timing diagrams of the power sequencing system in accordance with an embodiment of the present invention.

FIG. 3A is a timing diagram illustrating the operation of a particular sequencing logic circuit in FIG. 2 wherein the n-BIT COUNTER 201 is configured by the signal POWER_ON/POWER_OFF to increment in a power on mode. The PRE-PROGRAMMED n-BIT SEQUENCE POSITION 204 is configured to a value Y in this sequencing logic circuit. The timing diagram illustrates the timing sequences as the value of the n-bit CTR[n−1:0] signal is incremented from Y−1 through Y+2 by the n-BIT COUNTER 201 in this sequencing logic circuit. The cross hatched portion of CTR[n−1:0] signal, MATCH signal, and SEQ_LINK_DISABLE signal indicate the unstable transition period of the sequencing logic circuit. DELAY2 period is shown to be longer than the unstable transition period for proper operation of NOR gate 206 in the pulse generator circuit 200. DELAY1 is shown to be of a sufficient time period for proper operation of n-BIT COUNTER 201 as SEQ_LINK signal travels throughout the system in FIG. 1.

Figure 3B:
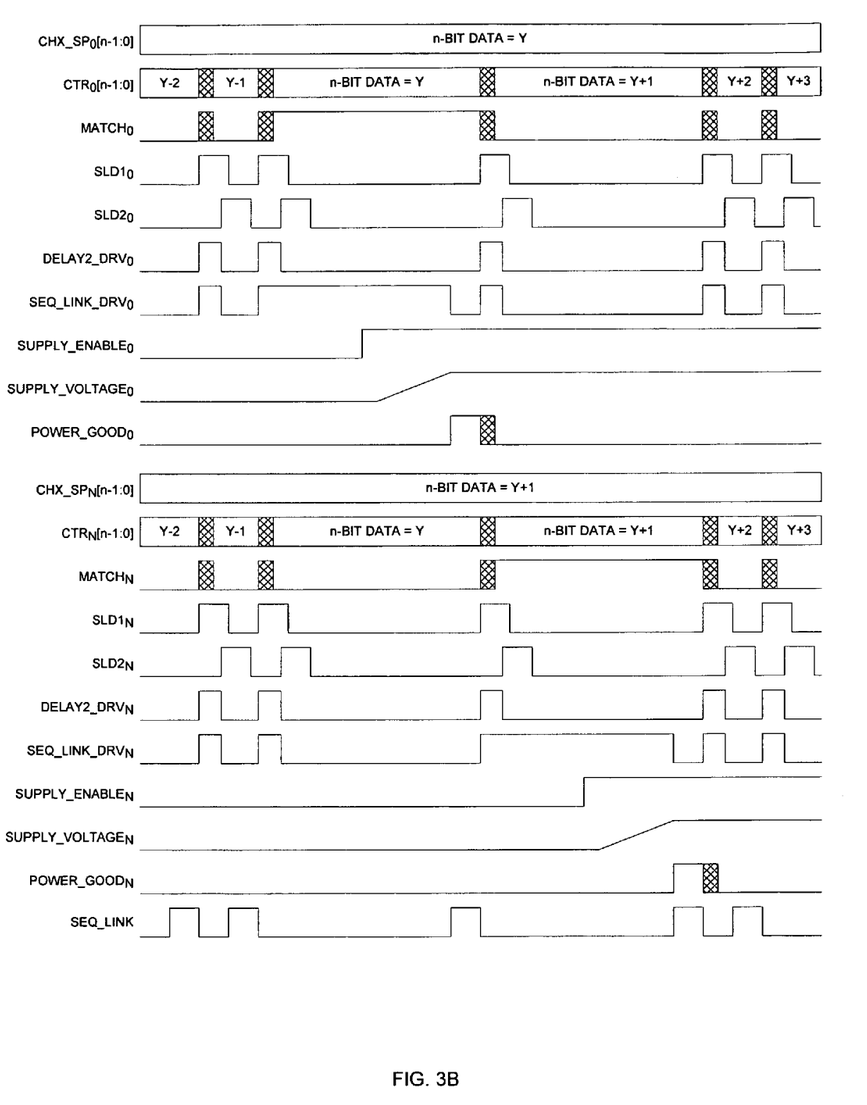

FIG. 3B is a timing diagram illustrating the operation of two sequencing logic circuits of device 0 and device 1 in FIG. 1. The PRE-PROGRAMMED n-BIT SEQUENCE POSITION 204 is configured to a value Y in the sequencing logic circuit of device 0. The PRE-PROGRAMMED n-BIT SEQUENCE POSITION 204 is configured to a value Y+1 in the sequencing logic circuit of device N.

Figure 3C:
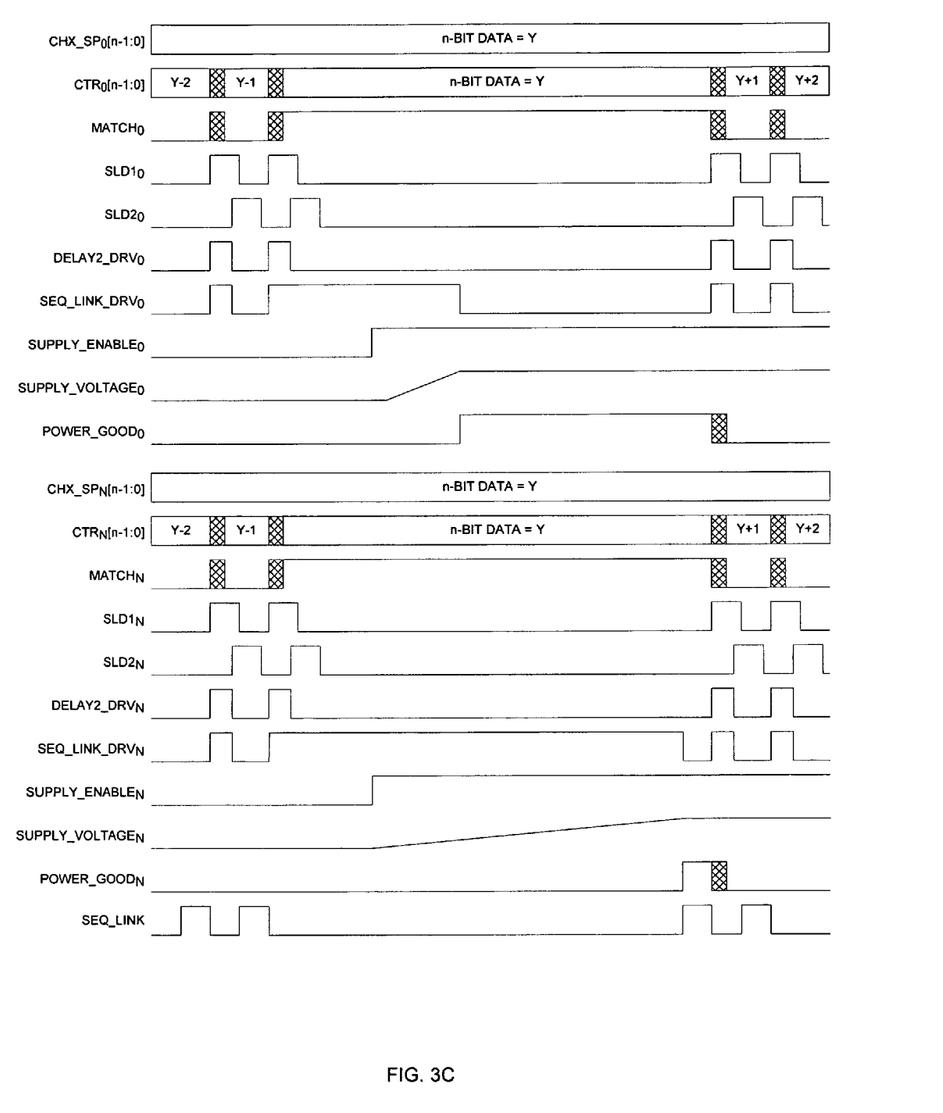

FIG. 3C is a timing diagram illustrating the operation of two sequencing logic circuits of device 0 and device 1 in FIG. 1. The PRE-PROGRAMMED n-BIT SEQUENCE POSITION 204 is configured to a value Y in the sequencing logic circuit of device 0. The PRE-PROGRAMMED n-BIT SEQUENCE POSITION 204 is also configured to a value Y in the sequencing logic circuit of device N.

Figure 4:
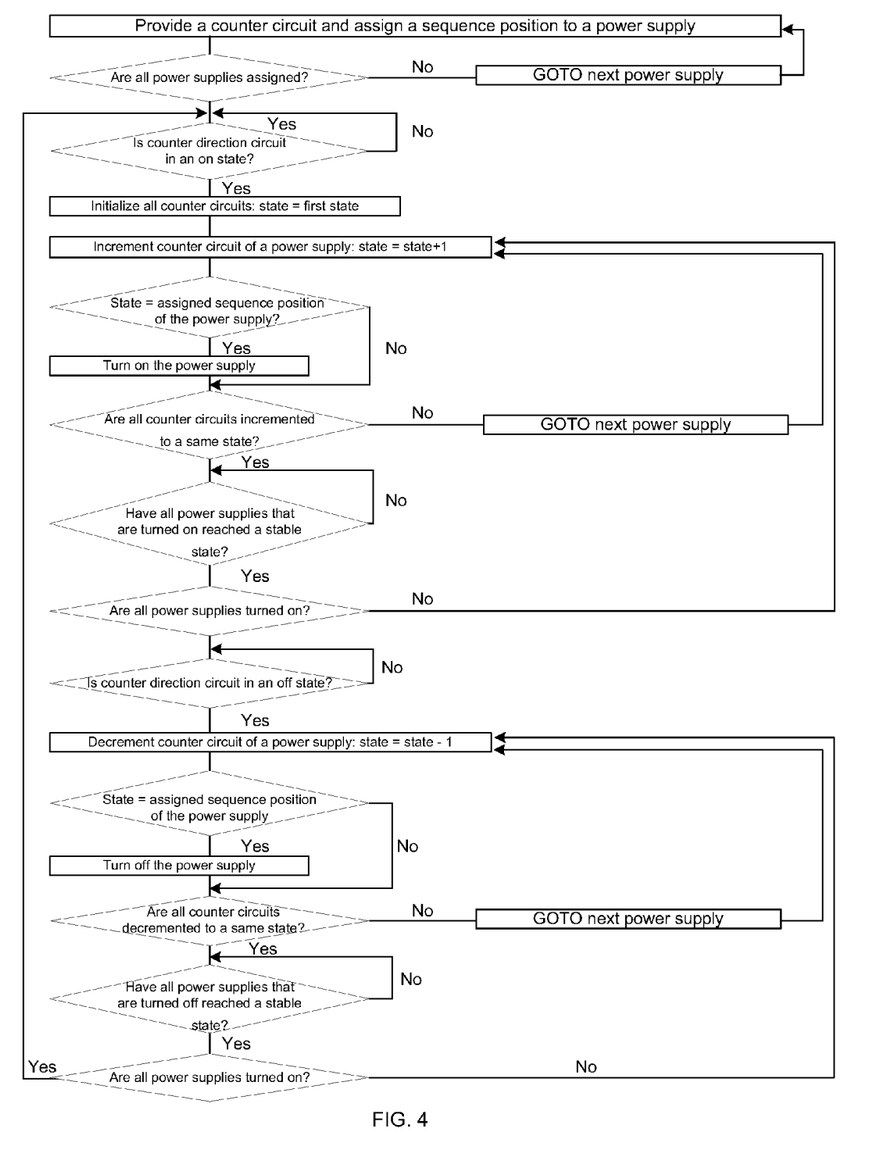
FIG. 4 is a high level logical flow chart of a method for selectively controlling the power on and power off sequence of an electronics system in accordance with an embodiment of the present invention.

FIG. 4 is a high level logical flow chart of a method for turning on a plurality of power supplies in a predetermined sequence and turning off the plurality of power supplies in a reverse sequence. It is shown that the counters increment in a power on mode and decrement in a power off mode.

Alternative embodiment 1 includes a configuration wherein the counters decrement in a power on mode and increment in a power off mode.

Alternative embodiment 2 includes a configuration wherein all the n-BIT COUNTER 201 in each of the devices in FIG. 1 are advancing synchronously but with different initial states.

Alternative embodiment 3 includes a configuration wherein multiple devices can be on a physical module and multiple sequencing logic circuits can be combined to share common components.

Alternative embodiment 4 includes a configuration wherein the sequence position configured for a power on mode is different from the sequence position configured for a power off mode.

Alternative embodiment 5 includes a configuration wherein one or more of the devices of FIG. 1 enable and monitor electronic components other than power supplies.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that connections or networks may be wired, wireless, or a combination of wired and wireless. Other variations and embodiments are possible in light of above teachings, and it is thus intended that the scope of invention not be limited by this Detailed Description, but rather by Claims following.

I claim:

1. An electronic circuit comprising:
   a plurality of power supplies;
   a plurality of separate devices, each said device comprising a logic circuit, each said logic circuit being associated with a particular power supply to form a plurality of logic circuit power supply pairs, each said logic circuit comprising circuitry to turn the associated power supply on and off; and
   a network coupled between the plurality of separate devices concurrently, wherein the network provides direct communication among each of the plurality of separate devices, wherein the network transports at least two signals to the plurality of separate devices;
   wherein one of the at least two signals is generated by each of said logic circuits and transported by the network to the plurality of separate devices, and wherein each said logic circuit uses the at least two signals together to turn the associated power supply on or off in a predetermined slot within a sequence.

2. The circuit of claim 1 wherein each said logic circuit comprises an independent predetermined slot within the sequence, wherein the sequence is predetermined.

3. The circuit of claim 2 wherein the predetermined sequence is programmed.

4. The circuit of claim 1 wherein at least one signal in the network comprises repetitive high and low states.

5. The circuit of claim 4 wherein a first logic circuit of a first device of said plurality of separate devices enables a first associated power supply in response to at least one of the signals and based on a first predetermined slot within the sequence in the first logic circuit, and wherein other logic circuits of said plurality of separate devices having a different predetermined slot within the sequence than the first predetermined slot within the sequence do not enable the associated other power supplies until after the first associated power supply reaches a stable state.

6. The circuit of claim 5 wherein a portion of each of the other logic circuits of said plurality of separate devices is disabled across said network until after the first power supply reaches a stable state.

7. The circuit of claim 6 wherein the portion of each of the other logic circuits of said plurality of separate devices is disabled in response to the at least one of the signals.

8. The circuit of claim 5 wherein, when the first associated power supply is enabled, the first logic circuit monitors a voltage of said first associated power supply until the first associated power supply reaches said stable state, and wherein said first logic circuit disables portions of other logic circuits of the plurality of separate devices until the first associated power supply reaches said stable state.

9. The circuit of claim 1 wherein the network comprises a signal having repetitive high and low states, each said logic circuit comprising:
   a counter coupled to the network to receive the signal, the counter generating a first digital signal;
   a programmed predetermined slot within the sequence; and
   a digital comparator coupled to receive the first digital signal from the counter and the programmed predetermined slot within the sequence,
   wherein the counter changes state in response to the signal, and wherein, when a value of the first digital signal is equal to the programmed predetermined slot within the sequence, the digital comparator generates a match signal, and in response to said match signal the associated power supply is enabled and one or more of the other logic circuits do not enable the other associated power supplies.

10. The circuit of claim 1 wherein the signals include at least one signal generated by one of said logic circuits and received by the other logic circuits to indicate that the particular power supply associated with the one of said logic circuits has reached a stable state.

11. The circuit of claim 1 wherein each said logic circuit receives at least one signal indicating whether or not a particular associated power supply is in a stable state, and wherein said at least one signal is coupled through each separate device to said network and to the other separate devices to control the other logic circuits.

12. A method comprising:
    receiving signals across a network in a first device of a plurality of separate devices, said first device comprising a first logic circuit and each other device of said plurality of separate devices comprises a logic circuit, wherein the first logic circuit is associated with a first power supply of a plurality of power supplies to form a first logic circuit power supply pair, wherein each of the plurality of power supplies is controlled by one of said logic circuits, and wherein each said power supply is associated with a particular logic circuit to form a plurality of logic circuit power supply pairs, said logic circuits, including the first logic circuit, each comprising circuitry to turn the associated power supply on and off; and
    wherein the network is coupled between the plurality of separate devices concurrently, wherein the network provides direct communication among each of the plurality of separate devices, wherein the network transports at least two signals to the plurality of separate devices,
    wherein one of the at least two signals is generated by each of said logic circuits and transported by the network to the plurality of separate devices, and wherein each said logic circuit uses the at least two signals together to turn the associated power supply on or off in a predetermined slot within a sequence.

13. The method of claim 12 wherein the first logic circuit comprises an independent predetermined slot within a predetermined sequence.

14. The method of claim 13 wherein the predetermined sequence is programmed.

15. The method of claim 12 wherein at least one signal in the network comprises repetitive high and low states and at least one other signal in the network comprises information about whether or not one or more of the power supplies are in a stable state.

16. The method of claim 15 wherein the first logic circuit enables the first associated power supply in response to the at least one signal and based on a first predetermined slot within the sequence, and wherein other logic circuits having a different predetermined slot within the sequence than the first predetermined slot within the sequence do not enable the associated other power supplies until after the first associated power supply reaches a stable state.

17. The method of claim 16 further comprising disabling, by the first logic circuit, a portion of each of the other logic circuits across said network until after the first power supply reaches the stable state.

18. The method of claim 12 further comprising:
turning on, by the first logic circuit, the first power supply; and
monitoring, by the first logic circuit, a voltage of the first power supply until the first power supply reaches a stable state; and
disabling, by the first logic circuit, portions of other logic circuits until the first power supply reaches said stable state.

19. The method of claim 12 wherein a first signal of the at least two signals has repetitive high and low states, the method further comprising:
generating a first digital signal that changes in response to the first signal;
generating a match signal in response to the first digital signal and a value indicating a sequence position;
turning on the first power supply in response to said match signal; and
generating a second signal on the network, the second signal indicating to one or more of the other logic circuits to not enable associated power supplies.

20. The method of claim 12 wherein the network includes at least one signal received by the first logic circuit and generated by a second logic circuit of the plurality logic circuits to indicate that the particular power supply associated with the second logic circuit has reached a stable state.

21. The method of claim 12 wherein the first logic circuit receives at least one signal indicating whether or not the first power supply is in a stable state, and wherein said at least one signal is coupled through the first logic circuit to said network and to the other logic circuits to control the other logic circuits.

22. An electronic circuit comprising:
a first power supply;
a first separate device comprising a first logic circuit coupled to and associated with the first power supply to form a first logic circuit power supply pair, the first separate device coupled to a network, the first logic circuit comprising circuitry to turn the first associated power supply on and off,
wherein the network is coupled between the first separate device and a plurality of other separate devices comprising a plurality of other logic circuits that are associated with a plurality of other power supplies, wherein each of the plurality of other logic circuits is associated with a particular power supply of the plurality of other power supplies to form a plurality of logic circuit power supply pairs, each said other logic circuit comprising circuitry to turn the associated power supply on and off, wherein the network provides direct communication among each of the separate devices concurrently, wherein the network transports at least two signals to the plurality of separate devices,
wherein one of the at least two signals is generated by the first logic circuit and transported by the network to the plurality of separate devices, and wherein each said logic circuit uses the at least two signals together to turn the associated power supply on or off in a predetermined slot within a sequence.

23. The circuit of claim 22 wherein each logic circuit comprises an independent predetermined slot within the sequence.

24. The circuit of claim 23 wherein the independent predetermined slot within the sequence is programmed.

25. The circuit of claim 22 wherein at least one signal in the network comprises repetitive high and low states and at least one other signal in the network comprises information about whether or not one or more of the power supplies are in a stable state.

26. The circuit of claim 25 wherein the first logic circuit enables the first power supply associated with the first logic circuit in response to the at least one signal and based on a first independent predetermined slot within the sequence, and wherein the other logic circuits having a different predetermined slot within the sequence than the first predetermined slot within the sequence do not enable the associated other power supplies until after the first power supply reaches a stable state.

27. The circuit of claim 26 wherein a portion of each of the other logic circuits is disabled across said network until after the first power supply reaches the stable state.

28. The circuit of claim 27 wherein the portion of each of the other logic circuits is disabled in response to the at least one signal.

29. The circuit of claim 22 wherein, when the first power supply is turned on, the first logic circuit monitors a voltage of said first power supply until the first power supply reaches a stable state, and wherein said first logic circuit disables portions of the other logic circuits until the first power supply reaches said stable state.

30. The circuit of claim 22 wherein the network comprises a signal having repetitive high and low states, the first logic circuit comprising:
a counter coupled to the network to receive the signal, the counter generating a first digital signal;
a programmed predetermined slot within the sequence; and
a digital comparator coupled to receive the first digital signal from the counter and the programmed predetermined slot within the sequence,
wherein the counter changes state in response to the signal, and wherein, when a value of the first digital signal is equal to the programmed predetermined slot within the sequence, the digital comparator generates a match signal, and in response to said match signal the first power supply is enabled and one or more of the other logic circuits do not enable associated power supplies.

31. The circuit of claim 22 wherein the network includes at least one signal generated by one of said other logic circuits and received by the first logic circuit to indicate that the particular power supply associated with the one of said other logic circuits has reached a stable state.

32. The circuit of claim 22 wherein the first logic circuit receives at least one signal indicating whether or not the first power supply is in a stable state, and wherein said at least one signal is coupled through the first logic circuit to said network and to the other logic circuits to control the other logic circuits.

* * * * *